(12) United States Patent
Sun et al.

(10) Patent No.: US 10,068,135 B2
(45) Date of Patent: Sep. 4, 2018

(54) FACE DETECTION, IDENTIFICATION, AND TRACKING SYSTEM FOR ROBOTIC DEVICES

(71) Applicant: TCL RESEARCH AMERICA INC., San Jose, CA (US)

(72) Inventors: Xinyao Sun, San Jose, CA (US); Xinpeng Liao, San Jose, CA (US); Xiaobo Ren, San Jose, CA (US); Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 36 days.

(21) Appl. No.: 15/388,372

(22) Filed: Dec. 22, 2016

(65) Prior Publication Data

US 2018/0181813 A1 Jun. 28, 2018

(51) Int. Cl.
| | |
|---|---|
| G06K 9/00 | (2006.01) |
| G06T 7/269 | (2017.01) |
| B25J 9/16 | (2006.01) |
| B25J 11/00 | (2006.01) |
| G06F 17/30 | (2006.01) |

(52) U.S. Cl.
CPC ......... *G06K 9/00711* (2013.01); *B25J 9/1697* (2013.01); *B25J 11/0005* (2013.01); *G06F 17/30256* (2013.01); *G06K 9/00255* (2013.01); *G06K 9/00268* (2013.01); *G06K 9/00288* (2013.01); *G06T 7/269* (2017.01); *G05B 2219/40425* (2013.01); *G06T 2207/10016* (2013.01); *G06T 2207/30201* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 2015/0055821 A1* | 2/2015 | Fotland | G06K 9/3241 382/103 |
| 2015/0213305 A1* | 7/2015 | Sundstrom | G06K 9/00281 382/118 |
| 2015/0269421 A1* | 9/2015 | Liu | G06K 9/629 382/118 |
| 2017/0286759 A1* | 10/2017 | Yao | G06K 9/00308 |

* cited by examiner

*Primary Examiner* — Sumati Lefkowitz
*Assistant Examiner* — David Perlman
(74) *Attorney, Agent, or Firm* — Anova Law Group, PLLC

(57) ABSTRACT

A face detection and tracking method of a robotic device. The method includes obtaining a video frame from a camera of the robotic device; performing a face detection process on the video frame to detect one or more faces in the video frame and, after the face detection process, identifying the detected one or more faces in the video frame. The method also includes performing a vision-based tracking process to track the identified one or more faces using a combination of a feature points tracker and a correlation tracker and, after the vision-based tracking process, performing a detection and tracking fusion process and providing desired target prediction of the identified one or more faces.

17 Claims, 4 Drawing Sheets

FACE DETECTION, IDENTIFICATION, AND TRACKING SYSTEM FOR ROBOTIC DEVICES

FIELD OF THE INVENTION

The present invention relates to the field of image processing technology and, more particularly, to a face detection, identification, and tracking system for robotic devices.

BACKGROUND

Human-machine interaction has become an important topic in the robotics community. The capabilities to detect human's presence is necessary to be integrated into an advanced robot. Human face detection, identification, and tracking are essential in active human-robot interaction scheme because the motion of a person's face is deeply related to his intention and attention. Robust human face detection, identification, and tracking have shown its value on various applications, such as taking care of seniors at home or patients in the hospital, enhancing the security in the public place, and delivering products to identified persons, etc.

However, the requirement of accuracy to run above face related tasks on a robot platform is a critical component for an advanced robot to interact with humans in a natural way. The common challenge is that movements of humans and robots are always in uncontrolled environments, which cause both face and background to change quickly over time within the camera scene. Thus, the accuracy of the face-related tasks on a robot may be decreased.

The disclosed system and method are directed to solve one or more problems set forth above and other problems.

BRIEF SUMMARY OF THE DISCLOSURE

One aspect of the present disclosure includes a face detection and tracking method of a robotic device. The method includes obtaining a video frame from a camera of the robotic device; performing a face detection process on the video frame to detect one or more faces in the video frame and, after the face detection process, identifying the detected one or more faces in the video frame. The method also includes performing a vision-based tracking process to track the identified one or more faces using a combination of a feature points tracker and a correlation tracker and, after the vision-based tracking process, performing a detection and tracking fusion process and providing desired target prediction of the identified one or more faces.

Another aspect of the present disclosure includes anon-transitory computer-readable medium having computer program. When being executed by a processor, the computer program performs a face detection and tracking method of a robotic device. The method includes obtaining a video frame from a camera of the robotic device; performing a face detection process on the video frame to detect one or more faces in the video frame and, after the face detection process, identifying the detected one or more faces in the video frame. The method also includes performing a vision-based tracking process to track the identified one or more faces using a combination of a feature points tracker and a correlation tracker and, after the vision-based tracking process, performing a detection and tracking fusion process and providing desired target prediction of the identified one or more faces.

Another aspect of the present disclosure includes a face detection and tracking system of a robotic device. The face detection and tracking system includes a face detection module, a face identification module, a vision-based tracking module, and a detector and tracker fusion module. The face detection module is configured to obtain a video frame from a camera of the robotic device and to perform a face detection process on the video frame to detect one or more faces in the video frame. The face identification module is configured to, after the face detection process, identify the detected one or more faces in the video frame. The vision-based tracking module is configured to perform a vision-based tracking process to track the identified one or more faces using a combination of a feature points tracker and a correlation tracker. The detector and tracker fusion module is configured to, after the vision-based tracking process, perform a detection and tracking fusion process and providing desired target prediction of the identified one or more faces.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
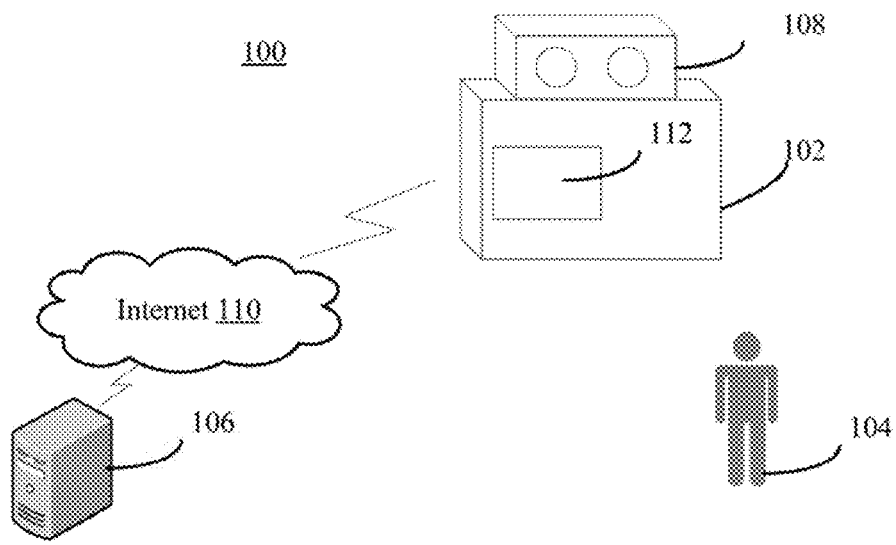
FIG. 1 illustrates an exemplary environment incorporating certain embodiments of the present invention.

FIG. 1 illustrates an exemplary environment 100 incorporating certain embodiments of the present invention. As shown in FIG. 1, environment 100 includes a robotic device 102, the Internet 110, a user 104, and a server 106. Other devices or components may also be included.

Robotic device 102 may include any appropriate type of electronic device with computing capabilities to implement a certain degree of artificial intelligence or automation, such as various types of robots or smart electronic devices, including a smart television (TV), a smart phone, a tablet, a personal computer (PC), a server computer, a laptop computer, and a digital personal assistant (PDA), etc.

User 104 may include any user or users of the robotic device 102 and/or any person or persons to be viewed or observed by the robotic device 102. The Internet 110 may include any number of communication network and servers for providing various data and/or functions for the robotic device 102, such as media data including streaming video, and photos and images, and/or image processing, etc.

The server 106 may include any appropriate type of server computer or a plurality of server computers for providing personalized contents to the user 106. For example, the server 106 may be a cloud computing server. The server 106 may also facilitate the communication, data storage, and data processing between the other servers and the robotic device 102. The robotic device 102, and server 106 may communicate with each other through one or more communication networks of the Internet 110, such as cable network, wireless network, and/or satellite network, etc.

Further, the robotic device 102 may include a camera 108 and a controller 112. Other components may also be included. Camera 108 may provide images and videos of the user 104 to the robotic device 102. Camera 108 may be an internal camera in the robotic device 102 or may be an external camera connected to the robotic device 102 over a network. In certain embodiments, camera 108 may be a single-lens camera. In certain other embodiments, camera 108 may be a stereo-lens or other type of camera.

The controller 112 may include one or more hardware processor and/or peripheral devices to provide control and processing functions for the robotic device 102. For example, the controller 112 may perform image processing and artificial, intelligence-related processing.

The controller 112 and/or server 106 may be implemented on any appropriate computing system. For example, FIG. 2 shows an exemplary block diagram of a computing system 200.

Figure 2:
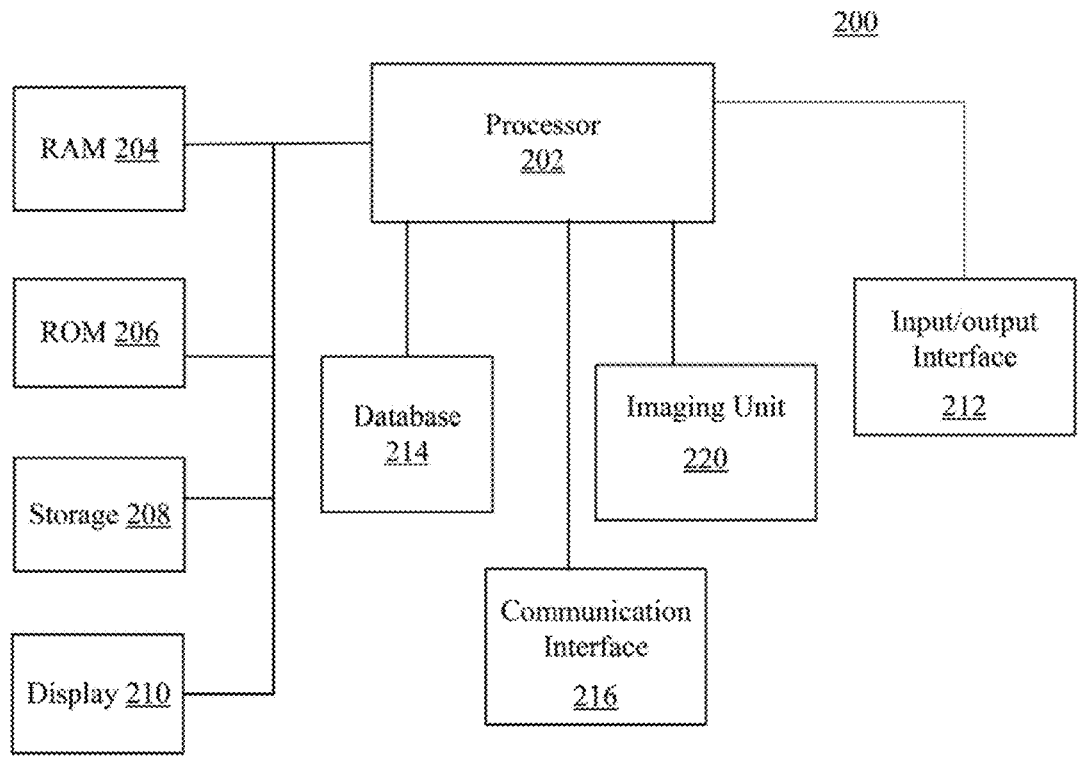
FIG. 2 illustrates an exemplary computing system consistent with the disclosed embodiments.

As shown in FIG. 2, computing system 200 may include a processor 202, a random access memory (RAM) unit 204, a read-only memory (ROM) unit 206, a storage unit 208, a display 210, an input/output interface unit 212, a database 214; a communication interface 216; and an imaging unit 220. Other components may be added and certain devices may be removed without departing from the principles of the disclosed embodiments.

Processor 202 may include any appropriate type of general purpose microprocessor, digital signal processor or microcontroller, and application specific integrated circuit (ASIC). Processor 202 may execute sequences of computer program instructions to perform various processes associated with robotic device 102. The computer program instructions may be loaded into RAM 204 for execution by processor 202 from read-only memory 206, or from storage 208. Storage 208 may include any appropriate type of mass storage provided to store any type of information that processor 202 may need to perform the processes. For example, storage 208 may include one or more hard disk devices, optical disk devices, flash disks, or other storage devices to provide storage space.

Display 210 may provide information to a user or users of robotic device 102. Display 210 may include any appropriate type of computer display device or electronic device display (e.g., CRT or LCD based devices). Input/output interface 212 may be provided for users to input information into robotic device 102 or for the users to receive information from robotic device 102. For example, input/output interface 212 may include any appropriate input device, such as a keyboard, a mouse, an electronic tablet, voice communication devices, or any other optical or wireless input devices. Further, input/output interface 212 may receive and/or send data from and/or to imaging unit 220.

Further, database 214 may include any type of commercial or customized database, and may also include analysis tools for analyzing the information in the databases. Database 214 may be used for storing image and graphic information and other related information. Communication interface 216 may provide communication connections such that robotic device 102 may be accessed remotely and/or communicate with other systems through computer networks or other communication networks via various communication protocols, such as transmission control protocol/internet protocol (TCP/IP), hyper text transfer protocol (HTTP), etc. The imaging unit may include any appropriate image capturing, storage, and/or processing components, which is couple to or coincide with the processor 202.

Figure 3:
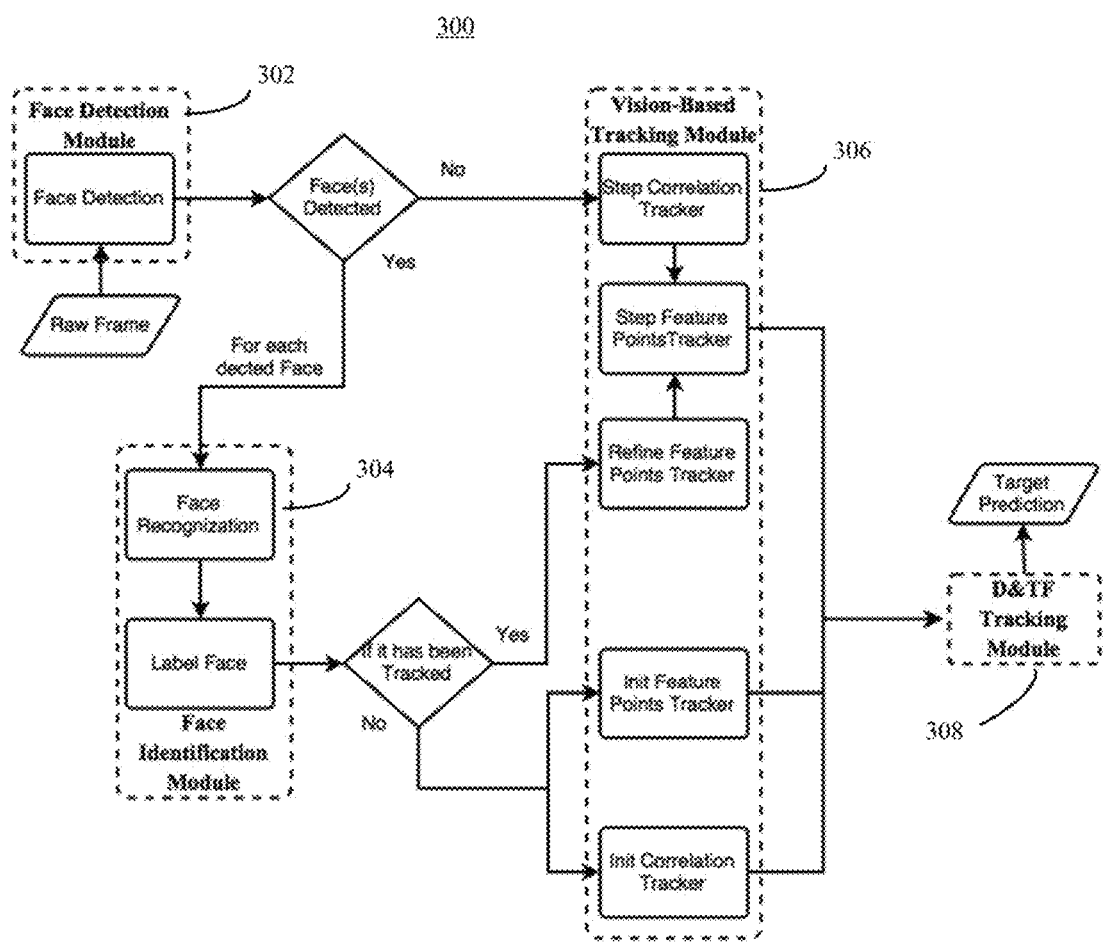
FIG. 3 illustrates an exemplary interactive face detection, identification, and tracking system consistent with the disclosed embodiments.

In operation, the robotic device 102 (e.g., the controller 112) and/or server 106 may obtain images and/or videos from the camera 108 and may perform a process for human face detection, identification, and tracking. That is, the controller 112 and/or the server 106 may implement an interactive face detection, identification, and tracking system. FIG. 3 illustrates an exemplary interactive system consistent with the disclosed embodiments.

As shown in FIG. 3, the interactive system 300 may include a face detection module 302, a face identification module 304, a vision-based tracking module 306, and a detector and tracker fusion (D&TF) module 308. Other modules may also be included.

The face detection module 302 may use one or more predetermined algorithm to detect human faces from image frames provided, to the face detection module 302. For example, a histogram-of-oriented-gradient (HOG) face detection algorithm may be used for face detection.

An HOG face detector may use a feature descriptor that counts occurrences of gradient orientation in localized portions of an image, and may be computed on a dense grid of uniformly spaced cells and uses overlapping local contrast normalization for improved accuracy.

More specifically, a set of pre-trained histogram-of-oriented-gradient (HOG) face detectors may be used for face detection, and each HOG face detector may be a classic HOG detector, which be configured for detection semi-rigid objects in images such as faces. In the case of that face might not always directly face to the camera, the face detection module 302 may include an out-of-5 HOG filters in combination with front looking, both left and right looking, further front looking but rotated both left and right.

Figure 5:
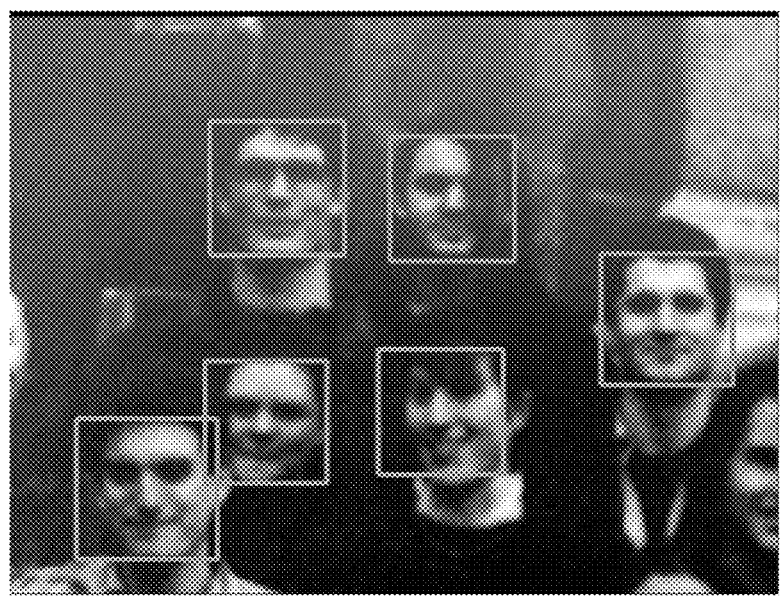
FIG. 5 illustrates an exemplary video frame with detected faces consistent with the disclosed embodiments.

The input of the face detection module 302 may include a raw frame as a solid image, and the output is a set of bounding boxes:

$$BB_{faces} = \{bb_{f1}^{(lx_1, ly_1, rx_1, ry_1)}, bb_{f2}^{(lx_2, ly_2, rx_2, ry_2)} \ldots bb_{fn}^{(lx_n, ly_n, rx_n, ry_n)}\}$$

corresponding to all detected faces $f_1, f_2, \ldots, f_n$, n is an integer representing the total number of faces, at current step, each contains the bounding box information of 1) location of left upper corner (lx,ly) and 2) location of bottom-right corner (rx,ry) of each bounding box $bb_f^{(lx,ly,rx,ry)}$, where lx, ly, rx, ry are coordinates. FIG. 5 illustrates a raw frame with detected faces.

The face identification module 304 may be configured to label the candidate face(s) from the face detection module 302. For example, the face identification module 304 may receive a cropped image of a given face from the original raw frame by a given $bb_f$, as provided by the face detection module 302. The face identification module 304 may use a predetermined algorithm to label the given face corresponding to the given $bb_f$.

For example, the face identification module 304 may apply a combination model of a trained lightened convulsion neural network and the moon loss model to extract a vector of facial features as the representation of a set of face attribute prediction. The interactive system 300 may have a database stored with labeled facial feature vectors with person identity. The output of the module is the label of the facial feature vector with the shortest distance to the given face's facial feature vector.

In certain embodiments, the face identification module 304 may perform face recognition, including extracting the facial features of the detected face(s), and then perform face labeling.

The vision-based tracking module 306 may use a vision-based tracking algorithm to track the identified faces from the face identification module 304. For example, vision-based tracking module 306 may include two vision-based object trackers to estimate the target face's scaling and translation at each time step, a first tracker may be a feature points tracker, and a second tracker may be a correlation tracker.

There may be two main functions for both trackers: initialization (e.g., initialization feature points tracker, initialization correlation tracker) and step processing (e.g., step feature points tracker, step correlation tracker). The input of the vision-based tracking module 306 is a target face's $bb_f$ and/or the raw frame image at current time step.

The first tracker may be a gradient based tracker using the Kanade-Lucas-Tomasi (KLT) approach. The first tracker may be initialized by a set of feature points. For example, the first tracker may use the minimum eigenvalue algorithm to extracts a set of reliable feature points within the region inside the given $bb_f$ on the raw frame image as $P_{KLT} = \{p_1^{(x_1,y_1)}, p_2^{(x_2,y_2)} \ldots p_n^{(x_n,y_n)}\}$. During the step processing, the KLT tracker works for tracking these feature points across the video frames, which means the point $p_i$ should be removed from $P_{KLT}$ if the tracker unable to locate it at the current frame otherwise its location $(x_i, y_i)$ will be updated. Further, if the face has already been tracked then $P_{KLT}$ should be refined by, for example, a refine feature points tracker. The vision-based tracking module 306 extracts the feature points again inside the $bb_f$ as $P_{refine}$, and refined $P_{KLT} = P_{KLT} \cup P_{refine}$.

The second tracker may be a correlation tracker under a tracking-by-detection framework. The tracker works by learnt discriminative correlation filters on scaled pyramid representations for both translation and scale estimation. For a given $BB_f$ with (h, w) as height and width, the system uses a larger bound box $bb_{corr} = bb_f^{(lx-1/4w, ly-1/4y, rx+1/4w, ry+h)}$ to initialize the correlation tracker. It allows the tracker to focus on more parts of the target person such as hair, neck, and part of the upper body. Then the initialized correlation tracker should try to follow whatever is inside the box at each further frame to update the $bb_{corr}$.

Further, the detector and tracker fusion (D&TF) module 308 may be provided for estimating the location information of each identified target face based on, the features extracted from previous modules.

The two trackers in the vision-based tracking module 306 both may have certain limitations. For example, the KLT tracker does not guarantee the corresponding point in the next frame is a feature point, especially if the object has sudden movement. Thus, the KLT tracker may cause lots of points lose and error located. The correlation tracker also has the same issue which may lead to the drifting problem. Moreover, both of the two trackers may be unable to handle occlusion easily, because the tracking model by the two trackers may only consider two consecutive frames.

Figure 4:
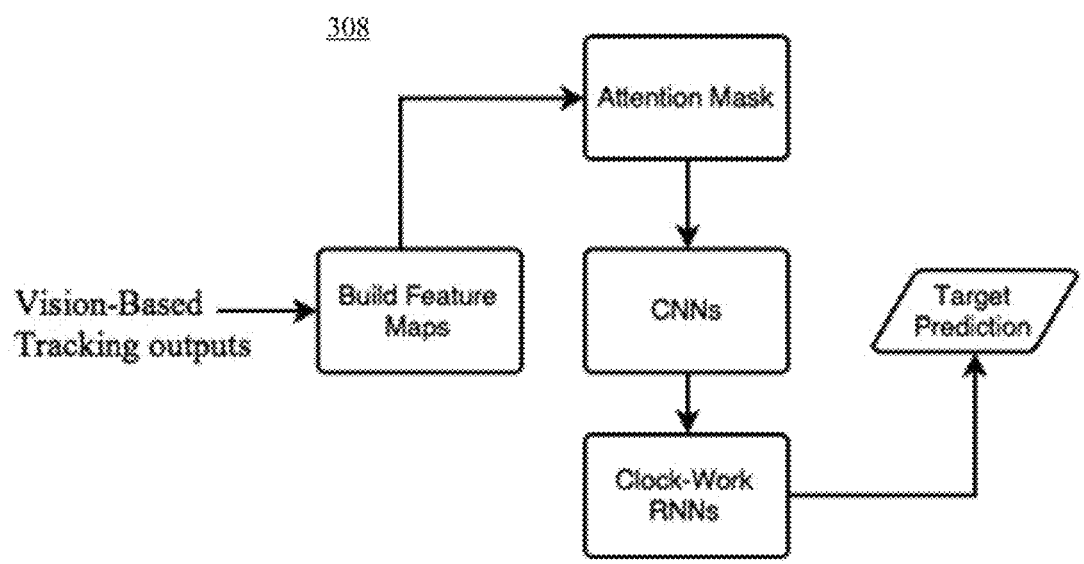
FIG. 4 illustrates an exemplary tracker fusion module consistent with the disclosed embodiments.

Accordingly, the fusion module 308 may provide improved accuracy and robustness by using the features extracted from previous modules to estimate the location information of each identified target face. FIG. 4 illustrates an exemplary D&TF fusion module 308.

At each time step t, the previous modules may generate the information $\{bb_f, P_{KLT}, bb_{corr}\}$ for each corresponding target face. For a certain target face, these information is treated as the raw input to this tracker fusion module. As shown in FIG. 4, the input is used to build a feature canvas or a feature map and then processed by an attention mask. Then, it is passed to a Conventional Neural Network and (CNN) and to a Clock-Work Recurrent Neuron Network (CWRNN) to generate the final output $e_t$ at current step t. In certain embodiments, the $e_t$ is formed as an estimation vector (e.g., with a vector of length of 6 factors) with target face's 1) location information $(lx_t, ly_t, rx_t, ry_t)$, 2) and the estimation of the face's or the object's velocity vector $(vx_t, vy_t)$. Thus, the location of the target, face can be predicted with significant accuracy even in the situations of occlusion or drifting.

Figure 6:
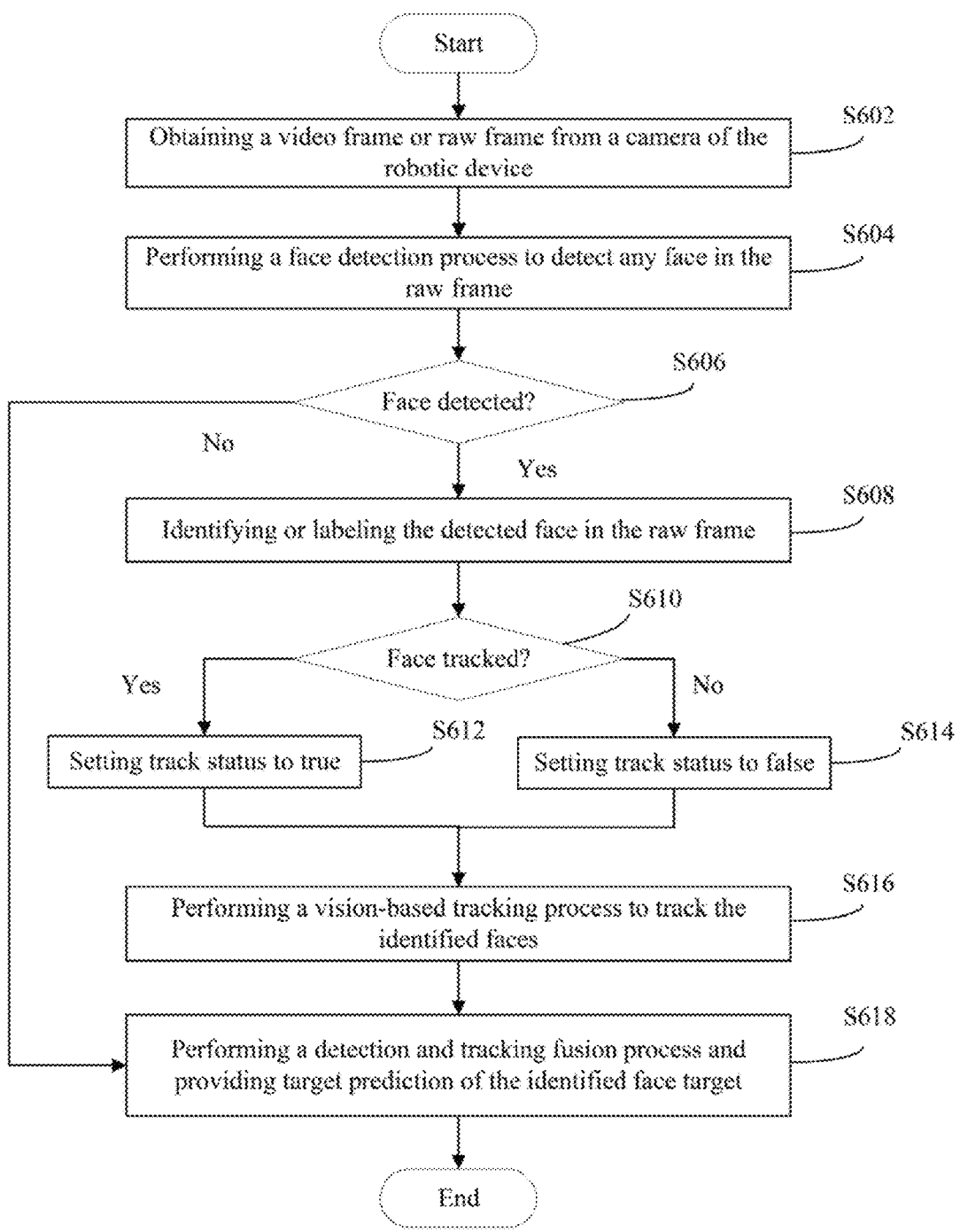
FIG. 6 illustrates an exemplary interactive face detection, identification, and tracking process consistent with the disclosed embodiments.

FIG. 6 illustrates an exemplary interactive process performed by robotic device 102 (e.g., processor 202 of the controller 112). As shown in FIG. 6, at the beginning of the process, video frames may be obtained from video frames or raw frames from a camera of the robotic device (S602).

For example, a raw frame is captured from a single lens camera of the robotic device as a main input of the interactive system. The raw frame may include one or more human faces in front of the robotic device, and the human face(s) may need to be detected, recognized, and tracked. In certain embodiments, the raw frame may also be obtained from other video sources in real time or stored in various media.

The frame can be further divided into objects and features of the video frame may be extracted for further processing. The face recognition may be performed on the objects to identify one or more preconfigured subject, i.e., face. Further, the raw frame may be provided to the face detection module to locate all face candidates at the current frame, and the face detection module may perform a face detection process to detect any and/or all faces in the raw frame (S604).

Further, it may be determined whether any face or faces in the raw frame is detected (S606). If it is determined that no face in the raw frame is detected (S606; No), the raw frame is provided to the vision-based tracking module for further processing. If it is determined that one or more faces are detected in the raw frame (S606; Yes), the detected face(s) is provide to the face identification module for identify and label the faces in the raw frame.

The face identification module may then identify or label the detected face(s) in the raw frame (S608). Further, it may be determined whether the face(s) has been tracked (S610). If it is determined the face has been tracked (S610; Yes), a track status of the face may be set to true, and the raw frame along with the labeled faces are provided to the vision-based tracking module (S612).

If it is determined the face has not been tracked (S610; No), a track status of the face may be set to false, and the raw frame along with the labeled faces are provided to the vision-based tracking module (S614).

Further, the vision-based tracking module may perform a tracking process to track the identified faces (S616). For example, if the track status is set to false, the vision-based tracking module may first perform initialization on the first tracker and the second tracker in the vision-based tracking module, and then may perform step tracking using the first tracker and the second tracker, e.g., creating corresponding correlation tracker and feature points tracker. On the other hand, if the track status is set to true, the vision-based tracking module may refine the feature points tracker (i.e., the first tracker) and then perform step tracking using the first tracker and the second tracker.

Thus, the face(s) in the raw frame is detected, identified, and tracked. However, after the vision-based tracking module performs the tracking process, the vision-based tracking module may provide both face detection data and the face tracking data including the raw frame data to the tracker fusion module to perform a detection and tracking fusion process to improve the face detection and the face tracking accuracy, especially when there is data loss under certain circumstances such as occlusion or drifting, by provide target prediction of the identified face target(s) (S618).

For example, the tracker fusion module may use the features extracted from previous modules to robustly estimate the location information of each identified target face. The detailed description of processing performed by the various modules may be similar to the description of the various module above, and is omitted herein.

After the tracker fusion module obtains the prediction of target prediction may be provide for an application program of the robotic device or may be displayed on a human-machine interface, etc. Thus, each human face in front of the robotic device (e.g., its camera) can be detected and identified, and the detected face(s) can be tracked robustly.

By using the disclosed systems and methods, a high-level system architecture with a multi targets face processing function may be provided, and a low level implementation may supply a vision space to feature space translation processing. Further, a jointly tuned tracker fusion module may be configured to maximize the tracking quality by overcoming problems of the existing face tracking techniques that hard to deal with the drifting and occlusion issues. Thus, the disclosed system may be able to robustly estimate the movement of all identified human faces in front of the robot's camera.

The description of the disclosed embodiments is provided to illustrate the present invention, to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features, disclosed herein. Other applications, advantages, alternations, modifications, or equivalents to the disclosed embodiments are obvious to those skilled in the art.

What is claimed is:

1. A face detection and tracking method of a robotic device, comprising:
   obtaining a video frame from a camera of the robotic device;
   performing a face detection process on the video frame to detect one or more faces in the video frame;
   after the face detection process, identifying the detected one or more faces in the video frame;
   performing a vision-based tracking process to track the identified one or more faces using a combination of a feature points tracker and a correlation tracker, comprising:
      for each identified face, determining whether the identified face has been tracked;
      when it is determined that the identified face has not been tracked, initializing the feature points tracker and the correlation tracker based on a set of feature points of the identified face;
      when it is determined that the identified face has been tracked, refining the feature points of the identified face; and
      using the correlation tracker to provide both translation and scale estimation of the identified face; and
   after the vision-based tracking process, performing a detection and tracking fusion process and providing desired target prediction of the identified one or more faces.

2. The face detection and tracking method according to claim 1, wherein performing a face detection process further includes:
   applying a histogram-of-oriented-gradient (HOG) face detector on the video frame to generate a set of bounding boxes of faces in the video frame to represent the detected one or more faces in the video frame.

3. The face detection and tracking method according to claim 2, wherein the set of bounding boxes are provided as:

$$BB_{faces} = \{bb_{f1}^{(lx1,ly1,rx1,ry1)}, bb_{f2}^{(lx2,ly2,rx2,ry2)} \ldots bb_{fn}^{(lxn,lyn,rxn,ryn)}\},$$

wherein n is an integer representing a total number of the one or more faces $f_1, f_2, \ldots, f_n$, and each bounding box $bb_f^{(lx,ly,rx,ry)}$ includes a location of left upper corner (lx,ly) and a location of bottom-right corner (rx,ry), lx, ly, rx, ry being coordinates.

4. The face detection and tracking method according to claim 2, wherein identifying the detected one or more faces further includes:
   extracting a facial feature vector of each of the detected one or more faces;
   comparing the extracted facial feature vector with a database stored with labeled facial feature vectors each with a person identity label; and
   labeling each face with the personal label of a facial feature vector in the database with a shortest distance to the extracted facial feature vector.

5. The face detection and tracking method according to claim 1, wherein performing a detection and tracking fusion process further includes:
   based on the set of bounding boxes, the set of feature points of the identified face, and the translation and scale estimation of the identified face, providing an estimation vector of the identified face including both location information and velocity vector of the identified face.

6. The face detection and tracking method according to claim 5, wherein providing an estimation vector further includes:
   based on the set of bounding boxes, the set of feature points of the identified face, and the translation and scale estimation of the identified face, building a feature map and applying an attention mask, a Conventional Neural Network and to a Clock-Work Recurrent Neuron Network to generate the estimation vector of the identified face.

7. A non-transitory computer-readable medium having computer program for, when being executed by a processor, performing a face detection and tracking method on a robotic device, the method comprising:
   obtaining a video frame from a camera of the robotic device;
   performing a face detection process on the video frame to detect one or more faces in the video frame;

after the face detection process, identifying the detected one or more faces in the video frame;
performing a vision-based tracking process to track the identified one or more faces using a combination of a feature points tracker and a correlation tracker, comprising:
for each identified face, determining whether the identified face has been tracked;
when it is determined that the identified face has not been tracked, initializing the feature points tracker and the correlation tracker based on a set of feature points of the identified face;
when it is determined that the identified face has been tracked, refining the feature points of the identified face; and
using the correlation tracker to provide both translation and scale estimation of the identified face; and
after the vision-based tracking process, performing a detection and tracking fusion process and providing desired target prediction of the identified one or more faces.

8. The non-transitory computer-readable medium according to claim 7, wherein performing a face detection process further includes:
applying a histogram-of-oriented-gradient (HOG) face detector on the video frame to generate a set of bounding boxes of faces in the video frame to represent the detected one or more faces in the video frame.

9. The non-transitory computer-readable medium according to claim 8, wherein the set of bounding boxes are provided as:

$$BB_{faces} = \{bb_{f1}^{(lx1,ly1,rx1,ry1)}, bb_{f2}^{(lx2,ly2,rx2,ry2)} \ldots bb_{fn}^{(lxn,lyn,rxn,ryn)}\},$$

wherein n is an integer representing a total number of the one or more faces $f_1, f_2, \ldots, f_n$, and each bounding box $bb_f^{(lx,ly,rx,ry)}$ includes a location of left upper corner (lx,ly) and a location of bottom-right corner (rx,ry), lx, ly, rx, ry being coordinates.

10. The non-transitory computer-readable medium according to claim 8, wherein identifying the detected one or more faces further includes:
extracting a facial feature vector of each of the detected one or more faces;
comparing the extracted facial feature vector with a database stored with labeled facial feature vectors each with a person identity label; and
labeling each face with the personal label of a facial feature vector in the database with a shortest distance to the extracted facial feature vector.

11. The non-transitory computer-readable medium according to claim 7, wherein performing a detection and tracking fusion process further includes:
based on the set of bounding boxes, the set of feature points of the identified face, and the translation and scale estimation of the identified face, providing an estimation vector of the identified face including both location information and velocity vector of the identified face.

12. The non-transitory computer-readable medium according to claim 11, wherein providing an estimation vector further includes:
based on the set of bounding boxes, the set of feature points of the identified face, and the translation and scale estimation of the identified face, building a feature map and applying an attention mask, a Convotional Neural Network and to a Clock-Work Recurrent Neuron Network to generate the estimation vector of the identified face.

13. A face detection and tracking system of a robotic device, comprising:
a memory; and
a processor coupled to the memory, wherein the processor is configured to:
obtain a video frame from a camera of the robotic device and to perform a face detection process on the video frame to detect one or more faces in the video frame;
after the face detection process, identify the detected one or more faces in the video frame;
perform a vision-based tracking process to track the identified one or more faces using a combination of a feature points tracker and a correlation tracker, comprising:
for each identified face, determine whether the identified face has been tracked;
when it is determined that the identified face has not been tracked, initialize the feature points tracker and the correlation tracker based on a set of feature points of the identified face;
when it is determined that the identified face has been tracked, refine the feature points of the identified face; and
use the correlation tracker to provide both translation and scale estimation of the identified face; and
after the vision-based tracking process, perform a detection and tracking fusion process and providing desired target prediction of the identified one or more faces.

14. The face detection and tracking system according to claim 13, wherein, to perform the face detection process, the processor is further configured to:
apply a histogram-of-oriented-gradient (HOG) face detector on the video frame to generate a set of bounding boxes of faces in the video frame to represent the detected one or more faces in the video frame.

15. The face detection and tracking system according to claim 14, wherein the set of bounding boxes are provided as:

$$BB_{faces} = \{bb_{f1}^{(lx1,ly1,rx1,ry1)}, bb_{f2}^{(lx2,ly2,rx2,ry2)} \ldots bb_{fn}^{(lxn,lyn,rxn,ryn)}\},$$

wherein n is an integer representing a total number of the one or more faces $f_1, f_2, \ldots, f_n$, and each bounding box $bb_f^{(lx,ly,rx,ry)}$ includes a location of left upper corner (lx,ly) and a location of bottom-right corner (rx,ry), lx, ly, rx, ry being coordinates.

16. The face detection and tracking system according to claim 14, wherein, to identify the detected one or more faces, the processor is further configured to:
extract a facial feature vector of each of the detected one or more faces;
compare the extracted facial feature vector with a database stored with labeled facial feature vectors each with a person identity label; and
label each face with the personal label of a facial feature vector in the database with a shortest distance to the extracted facial feature vector.

17. The face detection and tracking system according to claim 16, wherein, to perform the detection and tracking fusion process, the processor is further configured to: based on the set of bounding boxes, the set of feature points of the identified face, and the translation and scale estimation of the identified face, build a feature map and to apply an attention mask, a Conventional Neural Network and to a Clock-Work Recurrent Neuron Network to generate an estimation vector of the identified face including both location information and velocity vector of the identified face.

* * * * *